United States Patent [19]

Hake

[11] 4,213,506

[45] Jul. 22, 1980

[54] DRAG HARROW PRESSURE ADJUSTING DEVICE

[75] Inventor: Kenneth A. Hake, Tipton, Kans.

[73] Assignee: Kent Manufacturing Co., Inc., Tipton, Kans.

[21] Appl. No.: 961,622

[22] Filed: Nov. 17, 1978

[51] Int. Cl.² ............................................. A01B 19/08
[52] U.S. Cl. ..................... 172/624; 172/662; 172/739
[58] Field of Search ............... 172/142, 160, 197, 198, 172/620, 621, 623, 624, 626, 627, 629, 643, 657, 662, 739, 740; 403/92

[56] References Cited

U.S. PATENT DOCUMENTS

| | | | |
|---|---|---|---|
| 830,390 | 9/1906 | Whitehurst et al. | 172/739 X |
| 2,142,454 | 1/1939 | Needham | 172/645 |
| 2,725,807 | 12/1955 | Sibert | 172/739 X |
| 2,960,169 | 11/1960 | Collins | 172/198 |
| 3,100,018 | 8/1963 | Sokolowski | 172/160 |
| 3,532,171 | 10/1970 | Kasten | 172/197 |
| 3,566,974 | 3/1971 | Kopaska | 172/202 |
| 3,601,202 | 8/1971 | Steffe | 172/624 X |
| 3,976,145 | 8/1976 | Blair | 172/615 |
| 3,991,831 | 11/1976 | Foster | 172/198 |
| 4,126,190 | 11/1978 | Wylie | 172/624 |

FOREIGN PATENT DOCUMENTS

515479 6/1976 U.S.S.R. .................................. 172/197

Primary Examiner—Richard T. Stouffer
Attorney, Agent, or Firm—Fishburn, Gold & Litman

[57] ABSTRACT

For use with a farm implement frame, a drag harrow pressure adjustment device which includes bracket members designed to pivotally mount implement frame arms to an implement frame beam. The frame arms have mounted thereto harrow sections containing harrow teeth for ground working. A spring member, in cooperation with bracket members, introduces variable degrees of pressure to the frame arms resulting in the capability to regulate the ultimate downward pressure exerted by the harrow teeth on the underlying terrain. When desired, the frame arms are raised and maintained, through an over-center arrangement, at elevations disengaging the harrow teeth from terrain contact.

3 Claims, 7 Drawing Figures

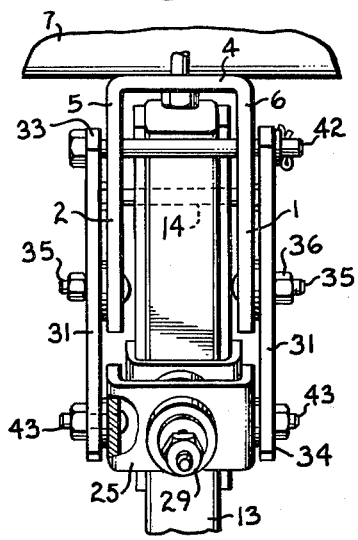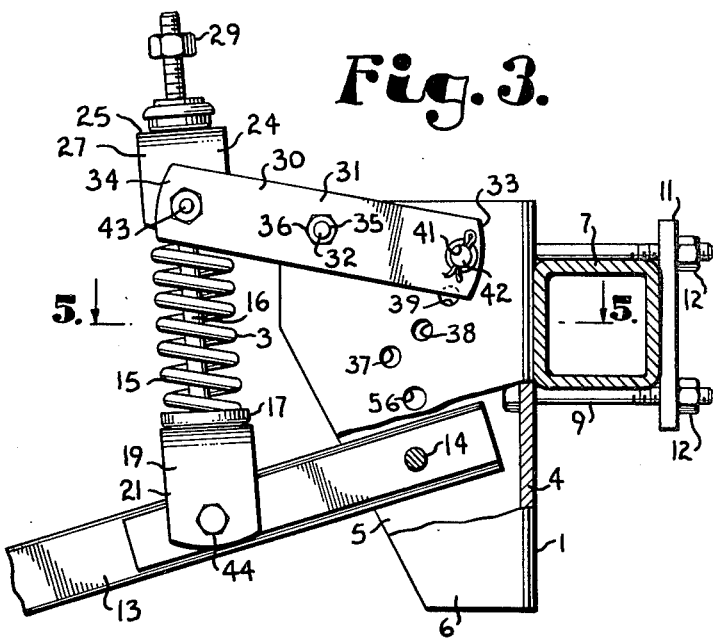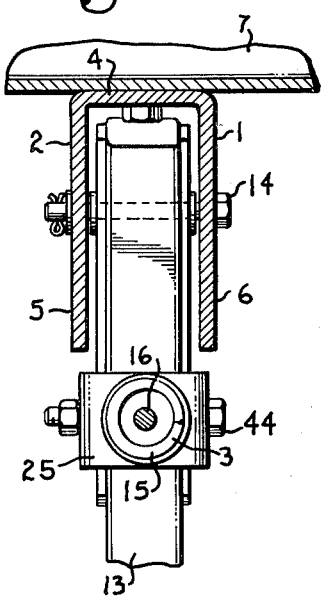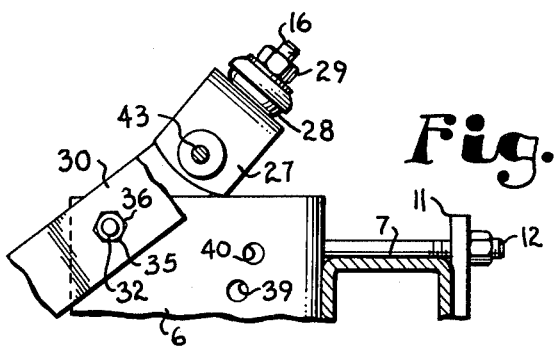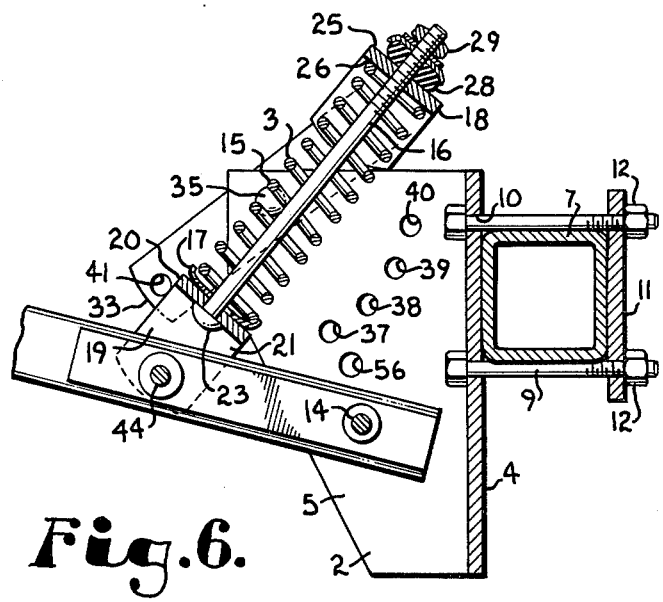

DRAG HARROW PRESSURE ADJUSTING DEVICE

The present invention relates to farming implements and more particularly to an improved mounting device for implement frame arms designed to variably regulate frame arm pressure on attached harrow sections.

SUMMARY OF THE INVENTION

In tillage operations, it has been recognized that considerable time and money can be saved, and soil packing reduced, by decreasing the number of tool swaths necessary to cover a given area. Consequently, implement carriages have been modified to simultaneously perform multiple functions. One desirable combination of functions is achieved by adding seed bed finishing tools, such as finishing harrows to a heavy carriage which supports cultivator tools, such as spring teeth or chisels. It is desirable within such structures to have the capability to adjust the downward pressure exerted by the harrow teeth, on the terrain according to soil conditions. It is also desirable to have the capability to easily disengage the harrow teeth from the underlying terrain without disengagement of other cultivator tools.

Prior devices either failed to address the need for adjustment of downward pressure exerted by harrow teeth on the underlying terrain, or involved considerable complexity. Also, simple structure was missing to disengage the harrow teeth from the ground surface, which is needed, for example, when traveling over paved roads. The invention is directed to simple, effective structure to accomplish the foregoing.

SUMMARY OF THE INVENTION

In the practice of the invention, a drag harrow pressure adjustment device generally comprises a bracket and spring structure designed to pivotally mount in vertical arcuate movement longitudinally extending implement frame arms, commonly called drag arms, to a transverse implement frame beam. The drag arms have mounted thereto harrow sections containing harrow teeth in ground working position. Each spring structure, containing a spiral compression spring, is attached at its ends to an underlying drag arm and bracket link arm members respectively. The compressed spiral spring in its desire to return to normal position, exerts downward pressure on the underlying drag arm. Adjustment of the link arm members through various elevations relatively compresses the spiral spring so as to determinately regulate the downward pressure exerted by the spring on the drag arm. In certain instances, the spiral spring may be independently compressed so as to introduce greater downward forces on the drag arm than available through link arm adjustment. The adjustability of the drag arm pressure introduces the capability to variably and ultimately regulate desired downward pressures exerted by the harrow teeth on the underlying terrain.

Pivotal mounting of the drag arm to the spring structure and the spring structure to the pivotable link arms allows the drag arms to be raised and maintained in a position disengaging the harrow teeth from a terrain contacting position. As the drag arms are raised, the spring structure and link arms rotates therewith so that the link arms rotate into a kinematically speaking, over-center position. This over-center position urges the spring structure forward and maintains the attached drag arms in their lifted position. The spring structure is locked therein preventing accidental drag arm fallback.

OBJECTS OF THE INVENTION

It is an object of the present invention to provide a simple, but effective arrangement for mounting, at various degrees of lift, finishing tool supporting arms to an implement frame. A further object of the invention is to provide such a device which allows the operator to pre-select downward pressures exerted by the supporting arms and then position the arms at such selected pressures. Another object of the invention is to provide such a mounting device which allows the arms to be mounted to the implement frame in up-and-down movement. A more particular object of the invention is to provide such a device with the above capabilities so that the ultimate downward pressure exerted by the finishing tools in the underlying terrain are easily and variably adjusted.

Other objects and advantages of this invention will become apparent from the following description taken in connection with the accompanying drawings, wherein are set forth by way of illustration and example, certain embodiments of this invention.

BRIEF DESCRIPTION OF THE DRAWINGS

FIG. 3 is a fragmentary side elevational view, on a larger scale, showing the harrow pressure adjustment device functionally mounting an implement frame arm.

FIG. 4 is a fragmentary top view of the device as shown in FIG. 3.

FIG. 5 is a fragmentary sectional top view along lines 5—5, FIG. 3.

FIG. 6 is a fragmentary vertical sectional view showing the spring structure member in an over-center position within the bracket member channel.

FIG. 7 is a fragmentary side elevational view of the device further illustrating the spring structure member in the over-center position.

DESCRIPTION OF THE PREFERRED EMBODIMENT

Figure 1:
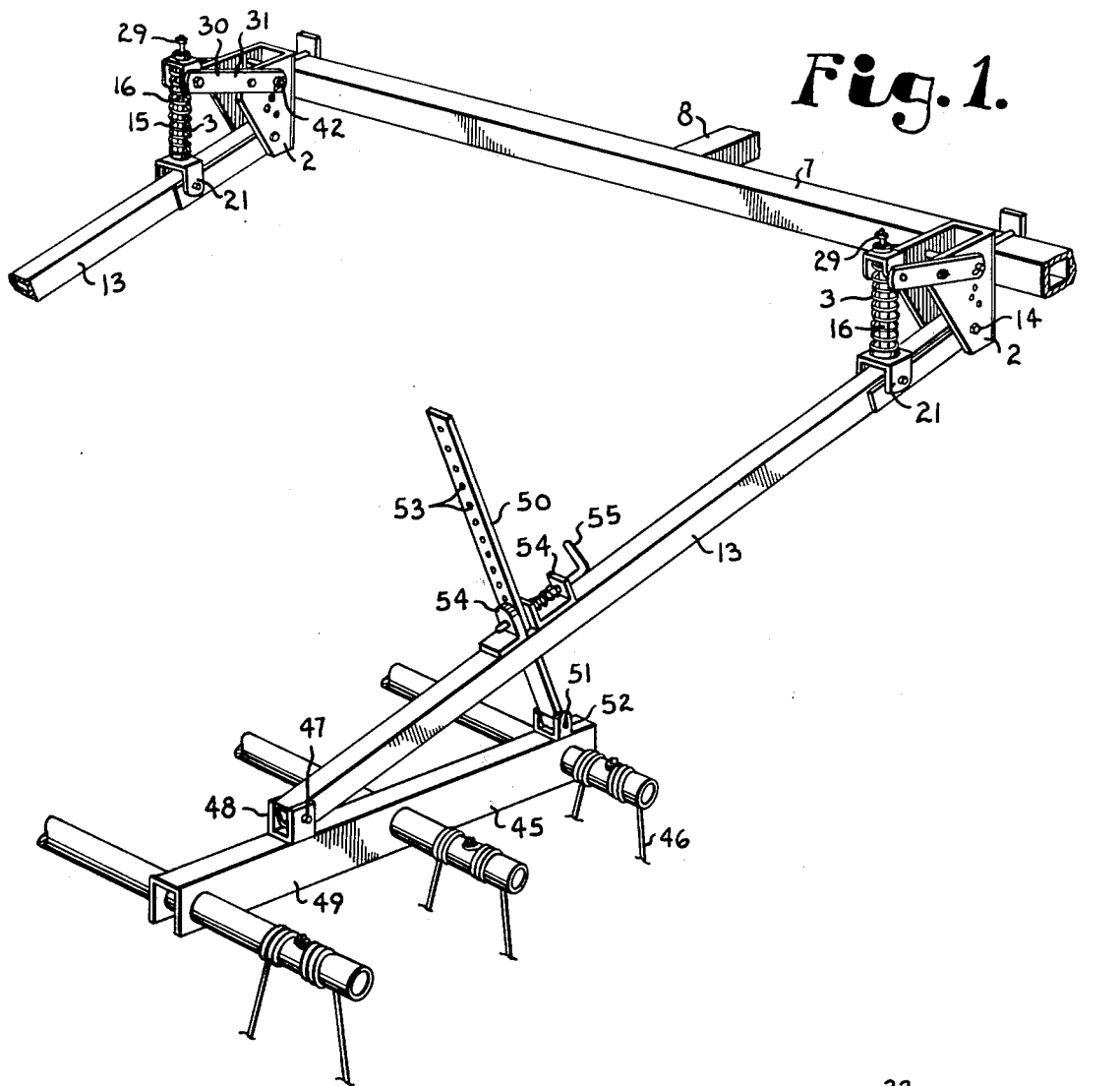
FIG. 1 is a fragmentary perspective view showing the harrow pressure adjustment device mounting an implement frame arm with harrow section attached.
Figure 2:
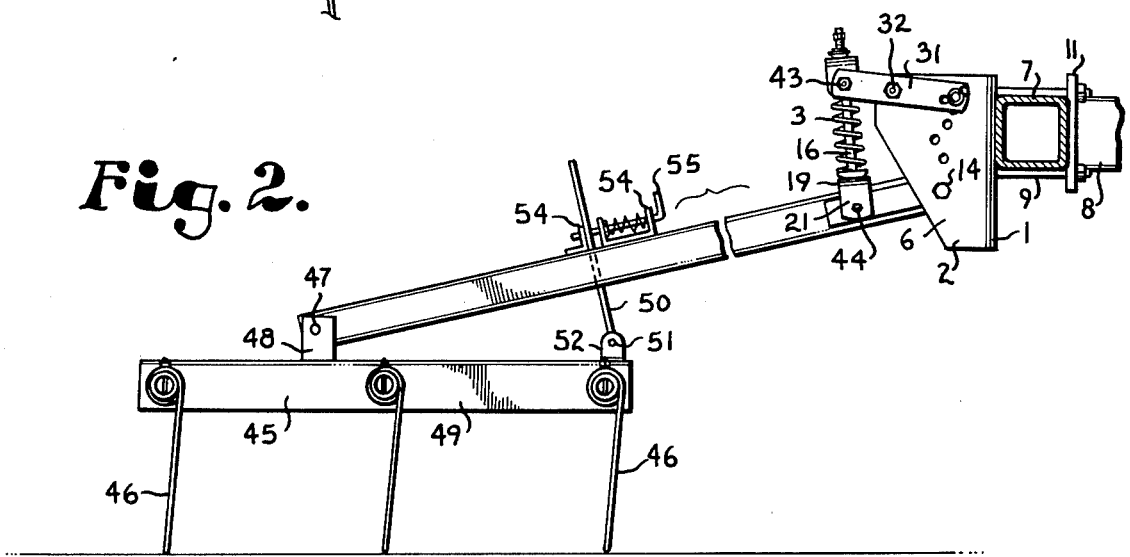
FIG. 2 is a fragmentary side elevational view of the device shown in FIG. 1.

Referring to the drawings in more detail, the harrow pressure adjustment device 1 comprises a channel-shaped bracket member 2 and a spring structure 3, connected between a spring compression member or link device 30 and underlying frame arm 13. The bracket member 2 comprises a vertical central web 4 spanning rearwardly extending sidewalls 5 and 6 forming a channel in between. Each bracket 2 is mounted to a transverse beam 7 of a general implement frame 8 by means of bolts 9 extending through apertures 10 in the bracket web 4 and secured to a clamp plate 11 by threaded nuts 12 functionally engaging the bolt free ends. At least two brackets 2 are laterally spaced along the transverse beam 7 so as to pivotally mount implement frame arms called drag arms 13 in vertical arcuate movement about one end by means of pin members 14 extending through the bracket sidewalls 5 and 6 and a forward end of the drag arm 13 lying in between.

Associated with each drag mount bracket 2 is a spring structure 3. Each spring structure comprises a spiral compression spring 15 encompassing a generally upwardly projecting, partially threaded shaft 16. Located along the shaft 16 and receiving the free ends of the spiral spring 15 are bearing members 17 and 18. A yoke swivel bracket 19 has a central web 20 contacting the bearing member 17 and extending, spaced-apart flanges 21. The shaft 16 extends through the web 20 and terminates in an enlarged head 23 which prevents upward withdrawal of the shaft 16 from the swivel bracket 19. The flanges 21 project over opposite faces of the frame arm 13, forwardly of the pin member 14, and are pivotally mounted to the frame arm by a pin member 44.

The link device 30 includes spaced apart link arms 31. A saddle member 24, spanning the distance between link arms 31, and similar in configuration to the swivel bracket 19, receives therethrough the top free end of the shaft 16. The bottom surface 26 of the saddle member web 25 forms the upper bearing member 18, but allows free upward projection of the shaft 16 therethrough. A neoprene washer 28 is positioned about the upper shaft projection on the upper surface of the central web 25. Functionally engaging the shaft 16 above the neoprene washer 28 is a threaded adjustment stop nut 29.

Each spring structure 3 is linked to the respective drag mount bracket 2 by means of pivotal attachment of the saddle 24 to the link device 30. Each link device 30, as noted above, includes two parallel link arms 31. The link arms 31 are congruent in configuration and pivotally mounted about a medial point 32 at aligned points on the respective bracket sidewalls 5 and 6 by means of short bolt members 35 extending through each arm 31, with threaded nuts 36 functionally engaging the bolt free ends. As shown in FIG. 3, the pivot point 32 on the respective sidewalls 5 and 6 is chosen to lie towards the top free edge of the bracket 2 so as to allow rearward extension of the link arm ends beyond the bracket sidewalls 5 and 6.

The spring structure 3 is pivotally attached to the link arm rear ends 34 by means of pin members 43 extending through the link arm rear ends 34, and through vertical flanges 27 of the saddle member 24. Pivotable attachment of the spring structure 3 to the underlying drag arms 13 is accomplished by means of the pin member 44 extending through the vertical flanges 21 of the lower swivel bracket 19 and drag arm 13 as is best shown in FIG. 3.

Located on the bracket sidewalls 5 and 6 are plurality of mutually aligned apertures 37, 38, 39 and 40 positioned along an arc having generally as a radius the distance between the link arm pivot point 32 and the center of an aperture 41, called the elevation aperture 41, located towards the link arm front end 33. The respective sidewall apertures 37, 38, 39 and 40 are aligned with the elevation apertures 41 as the link arms 31 are pivoted about their medial point 32. As the link arm front ends 33 swing along this arc, the rear ends 34 are concurrently positioned in elevations contra the front end movement, so as to raise or lower the saddle 24 along the guide shaft 16. Insertion of a quick pin 42 through the aligned apertures fixes the link arms 31 and, thereby, the saddle 24 in an operator selected position. Relative positioning of the saddle along the guide shaft 16 variably compresses the spiral spring 15, depending on the pivotal position of the underlying drag arm 13 about the pin member 14.

This fixation of the saddle 24 urges the spring 15, in its desire to return to its normal state, to bear against the underlying drag arm 13, and exert pressure thereon so as to urge the drag arm 13 vertically apart from the link arms 31 towards the terrain. Transference of the drag arm pressure to the attached harrow section 45 enables the ultimate pressure exertion by the coil tines 46 on the terrain to be regulated by the foregoing pressure adjustment. The adjustment nut 29 changes the beginning saddle 24 position on the shaft 16 so as to provide an initial relative compression of the spring 15.

The harrow section 45, as shown in FIG. 1, with coil tines 46, is pivotally attached to the rear free end of the drag arm 13 by means of pin member 47 extending through a bracket 48 located on the harrow carrier arm 49. Longitudinal harrow cant is adjusted by means of leveling arm 50 pivotally attached to the harrow carrier arm 49 by means of pin member 51, extending through the leveling arm 50, and leveling arm bracket 52 located on the carrier arm 49. The desired cant, once chosen, is achieved by urging the projection of the leveling arm 50 through slots in drag arm 13. This cant is maintained by means of pin members 55 extending through leveling arm brackets 54, located on the drag arm 13, and through apertures 53 located along the length of the leveling arm 50. The aperture chosen will vary according to the cant desired.

OPERATION

It is necessary at times to operate the harrow with the coil tines 46 in a generally vertical position, as when high soil penetration is desired. At other times, It may be desirable to have the tines 46 extend towards the rear of the harrow, as when operating in trashy soil conditions. The angular position of the tines relative to the terrain is designated as the drag angle and is adjustable by known structure, not shown herein. Once the drag angle and harrow cant are chosen and positioned, it is also desirable to adjust the downward pressure exerted by the coil tines 46 on the underlying surface. For example, if the soil is tightly packed, it is necessary to have greater downward pressure exerted by the coil tines 46 than when the soil is loose. The method of adjusting the downward pressure on the coil tines 46 is achieved by adjustment of the pressure exerted by the drag arms 13 on the supported harrow section 45. This is done by use of the above described harrow pressure adjustment device 1 in the following manner.

Adjustment of drag arm pressure is achieved by aligning the elevation apertures 41 with a selected sidewall aperture 37–40 which conversely raises or lowers the saddle 24 along the guide shaft 16 relative to the link arm front end 33 movement. Alignment of the elevation aperture 41 with the highest sidewall apertures 40 results in the lowest placement of the saddle along the shaft 16 and greatest relative spring compression. Saddle fixation at this point by quick pin 42 insertion through the aligned apertures results in maximum spring bearing against the underlying frame arm 13, ultimately resulting in a maximum selected pressure exerted by the coil tines 46 on the underlying terrain.

Alignment of the elevation apertures 41 with the lowest sidewall apertures 37 results in the highest placement of the saddle 24 along the shaft 16 and least spring compression. Fixation of the saddle 24, as above, results in a minimum degree of spring force bearing against the underlying drag arm 13, ultimately resulting in a minimum selected pressure exerted by the coil tines 46 on the terrain.

Elevational aperture 41 alignment with the remaining apertures 38 and 39 results in the adjustment of the frame arm at pressures between the minimum and maximum adjustable pressures described above. Thus, in the use of the harrow pressure adjustment device 1, a range of adjustable drag arm pressures is available to the operator so that the ultimate pressure exerted by the coil tines 46 is variable according to operator selection.

By adjusting the nut 29 along the shaft 16, the spring 15 can be relatively preloaded so that different ranges of spring pressures can be achieved within the adjustments permitted by the quick pin placements noted above. Thus, a highly preloaded spring will produce a higher pressure, shorter range of operational drag arm positions and a relatively unloaded spring will allow a greater range of drag arm movement at relatively lower soil bearing pressures.

Another advantage in the operation of the described harrow pressure adjustment device, is that the drag arm 13 may be easily lifted and locked in elevated position so that the coil tines 46 will be completely disengaged from the underlying terrain, as for non-functional harrow transit. To accomplish this, the quick pin 42 is removed from the aligned apertures, allowing free rotation of the link arms front ends 33. The frame arms 13 are then raised until the pivotally mounted spring structure 3 rotates into the bracket channel with the bottom edge of the saddle flanges 27 resting on the top free horizontal edges of the bracket sidewalls 5 and 6, FIG. 6 and 7. Concurrent with the spring structure rotation, the link arm front ends 33 rotate in a downward and rearward direction so that the elevation apertures 41 are positioned somewhat rearwardly of the lower swivel bracket 19. This results in the link arms rear ends 34 being in an over-center position, as the longitudinal axes of the link arms 31 have rotated forwardly past the line of coincidency of the longitudinal axis of the shaft 16. Therefore the link arm rear ends 34 attempt to pivot toward a forward position resisted by the contact between the saddle flanges 27 and bracket sidewalls 5 and 6. This position concurrently locates the attached drag arms 13 in a lifted position, restrained from downward movement by the tension of the shaft 16 through the nut 29 bearing on the washer 28, which bears on the saddle 24. The quick pin 42 may be positioned through the elevation apertures 41 for preventing accidental forward rotation of the link arm front ends 33, and resulting disengagement of the spring structure 3 from its over-center position.

Another advantage in the operation of the harrow pressure adjustment device 1 is that the drag structure may be used on a foldable type carriage frame which allows the implement frame 8 to be rotated into a vertical position. Insertion of the quick pin 42 through mutually aligned apertures 56 in the bracket sidewalls 5 and 6 act as a stop point against the upper surface of the drag arm 13 when the implement frame 8 is rotated into a vertical position. Contact by the quick pin projection against the frame arm upper surface prevents frame arm fallback so as to maintain the frame arms 13 and harrow section 49 in the lifted position.

It is to be understood that while certain forms of this invention have been illustrated and described, it is not to be limited thereto, except insofar as such limitations are included in the following claims.

What I claim and desire to secure by Letters Patent is:

1. For use with a farm implement frame having a transverse beam, a plurality of rearwardly extending arms supporting soil finishing tools, mounting structure for attaching the forward end of said arms to said beam, said mounting structure comprising:
   (a) a pressure bracket adapted for securing to said beam, hinge means pivotally supporting said arm forward end to said bracket for frame arm vertical arcuate movement,
   (b) spring structure associated with said bracket and including a compression spring having a lower end operably bearing against said arm rearwardly of said hinge means,
   (c) link means mounted on said bracket, said compression spring having an upper end bearing against said link means,
   (d) adjusting means associated with said link means and said bracket, said adjusting means selectively retaining said link means in predetermined alternate positions whereby the bearing pressure of said spring against said arm is selectively altered,
   (e) said link means being pivotally mounted on said bracket intermediate the ends of said link means,
   (f) one of said link means ends receiving the force of said spring, and
   (g) a locking member associated with said bracket, the other of said link means ends receiving said locking member, said link means other end and said locking member comprising said adjusting means.

2. For use with a farm implement frame having a transverse beam, a plurality of rearwardly extending arms supporting soil finishing tools, mounting structure for attaching the forward end of said arms to said beam, said mounting structure comprising:
   (a) a pressure bracket adapted for securing to said beam, hinge means pivotally supporting said arm forward end to said bracket for frame arm vertical arcuate movement,
   (b) spring structure associated with said bracket and including a compression spring having a lower end operably bearing against said arm rearwardly of said hinge means,
   (c) link means mounted on said bracket, said compression spring having an upper end bearing against said link means,
   (d) adjusting means associated with said link means and said bracket, said adjusting means selectively retaining said link means in predetermined alternate positions whereby the bearing pressure of said spring against said arm is selectively altered,
   (e) a tension shaft extending within said spring and operably connected to said arm rearwardly of said hinge means,
   (f) said tension shaft being operably connected to said link means for supporting said arm against downward pivoting beyond a predetermined position thereof; and
   (g) over-center means mounting said link means to said bracket and selectively supporting said tension shaft in a position retaining said arm elevated to a point whereby said soil finishing tools are spaced from the ground.

3. For use with a farm implement frame having a transverse beam, a plurality of rearwardly extending arms supporting soil finishing tools, mounting structure for attaching the forward end of said arms to said beam, said mounting structure comprising:
   (a) a pressure bracket adapted for securing to said beam, hinge means pivotally supporting said arm forward end to said bracket for frame arm vertical arcuate movement,
   (b) spring structure associated with said bracket and including a compression spring having a lower end operably bearing against said arm rearwardly of said hinge means,
(c) link means mounted on said bracket, said compression spring having an upper end bearing against said link means, and
(d) adjusting means associated with said link means and said bracket, said adjusting means selectively retaining said link means in predetermined alternate positions whereby the bearing pressure of said spring against said arm is selectively altered,
(e) said adjusting means includes a series of arcuately spaced openings in said bracket.

* * * * *